March 22, 1927.
C. D. GILMAN
1,621,776
APPARATUS FOR SUPPORTING TREE LIMBS AND THE LIKE
Filed July 27, 1926
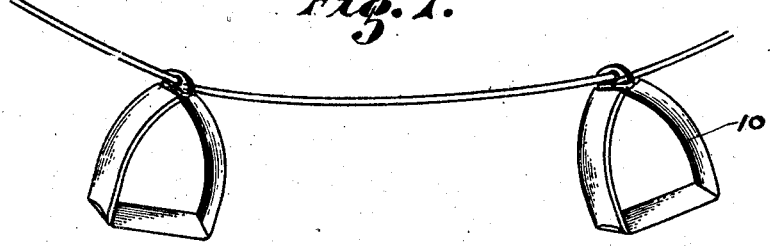
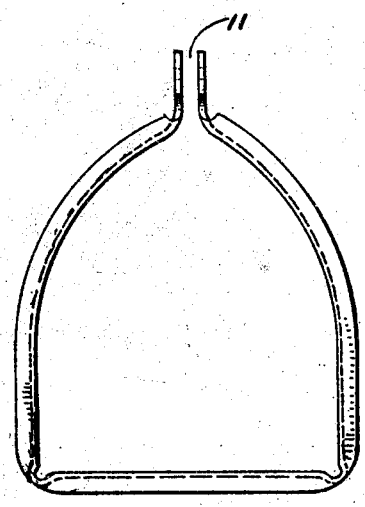 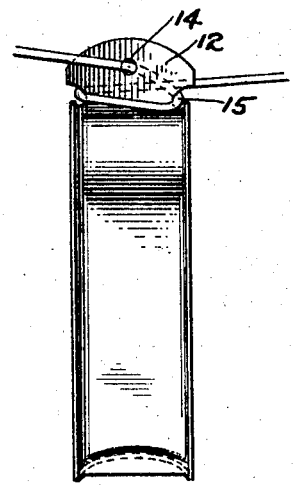
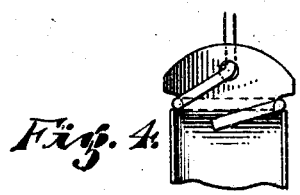
INVENTOR.
CHARLES D. GILMAN
BY Dewey, Strong, Townsend & Loftus
HIS ATTYS.

Patented Mar. 22, 1927.

1,621,776

UNITED STATES PATENT OFFICE.

CHARLES D. GILMAN, OF OAKLAND, CALIFORNIA.

APPARATUS FOR SUPPORTING TREE LIMBS AND THE LIKE.

Application filed July 27, 1926. Serial No. 125,176.

This invention relates to a method of, and apparatus for, supporting tree limbs.

The oldest method of supporting tree limbs is by means of wooden stakes or props resting on the ground, but the cost of these has so advanced in recent years as to make their use prohibitive. Moreover, they deteriorate rapidly and by their presence around the trunk of the tree they interfere with necessary orchard operations. Braces consisting of a central ring from which tie wires radiate to the tree limbs have been used. As hitherto constructed a screw eye is fastened to each limb of the tree and a tie wire is then hooked on to each screw eye and securely twisted with pliers. The inner ends of the tie wires are then fastened to a central ring by means of a figure 8 twist. These operations require a great real of time and skill and necessitate the employment of two men. The screw eyes injure the trees as does also climbing of the tree which is necessary to connect the tie wires to the central ring. Also, if the limb becomes unduly heavy from the weight of the fruit, the screw eyes are likely to pull out.

In United States Letters Patent #1,604,095 issued to me October 19, 1926, I disclose an invention contemplating the use of wires but overcoming the objections and disadvantages above noted.

This prior disclosure makes use of a center disk or plate having perforations through which wires may be strung, the ends of the wires continuing in opposite directions to the tree limbs which are diametrically disposed. A clamping band encircles the limbs of the tree and the wire ends are fastened to these clamping bands in a simple manner which does not require the use of tools. The wires can be threaded on to the central disk or plate while the operator is on the ground, and, thereafter, positioned in the tree in the form of a web. It is then only necessary for the operator to place the clamping bands around the various limbs and tie the wire ends thereto, and this can be done readily by mounting a ladder without climbing into the tree.

It is the principal object of the present invention to generally improve and simplify the method and apparatus for supporting tree limbs, which apparatus can be applied quickly and easily, and will not injure the tree limbs nor necessitate climbing the trees.

In carrying out this object I make use of a plurality of clamping bands which encircle the limbs of the tree and which are all connected by wire arranged circumferentially of the tree. The clamping bands can be arranged on the wire while the operator is on the ground and can be connected to the wire as they are arranged on the limbs.

One form which my invention may assume is exemplified in the following description and illustrated in the accompanying drawings, in which—

Fig. 1 shows a plan view of a circular wire with a plurality of limb supporting clamping bands arranged thereon.

Fig. 2 discloses a plan view of the clamping band.

Fig. 3 is a side elevation of the clamping band connected to the wire.

Fig. 4 is a fragmentary view in end elevation of the band showing the method of fastening a radial wire thereto when the band is used in connection with the web arrangement of braces.

Referring more particularly to the accompanying drawings I show a clamping band 10 to fit around each limb to be supported. This band is substantially stirrup-shaped with an open end 11. The terminating ends of the band are each provided with a projecting locking lug 12. These lugs are formed with aligned openings 14 and notches 15. The notches are arranged at opposite sides of the lug as shown in Fig. 3 and at the junction between the lug and the band proper.

In practice the ends of the band are spread apart so as to fit over the tree limb, and the lugs are then moved together. The end of the tie wire is then threaded through the openings 14 and twisted around the lugs in the notches 15 as shown in Fig. 3. When used in connection with a circular wire arranged circumferentially of the tree the tie wire is led from one band to another and its ends are drawn together and connected.

It is obvious from Fig. 1 that as many clamping bands as may be desired can be arranged on the wire, and they may be positioned relatively so as to be indirect alignment with each limb. The clamping bands may be threaded on to the wire one by one as they are arranged on the limbs, after which the wire may be connected thereto as previously described to firmly clamp the same together and hold it in position. The shape of the clamping band is important. It will be noted that its sides and bottom are made concave as shown in Fig. 3. This adds to the crushing strength of the band and also prevents its being distorted, and in addition gives a smooth, rounded surface for contact with the tree limb. The stirrup shape of the band affords great pulling strength and is self-centering, as well as adapted to many different sizes and shapes of limbs. In small sizes of tree limbs the stirrup-shaped band will have contact at two points, whereas in larger sizes it may contact with the limb at three points.

The clamping band disclosed in the present application may be used in connection with the method disclosed in my prior application hereinbefore mentioned. When used in connection with the radial brace wires the clamping band is arranged on the limb and the end of the wire is threaded through the openings 14 and then wound around the lugs 12 in engagement with the notches 15 such as shown in Fig. 4. Such a fastening has been found to afford great security.

It is obvious that the clamping band and mode of connecting it to the brace wires may be used for many different purposes.

While I have shown the preferred form of my invention it will be understood that various changes may be made in the combination, construction and arrangement of parts, without departing from the spirit of the invention as claimed.

Having thus described my invention, what I claim and desire to secure by Letters Patent is:

1. A tree limb supporting device comprising a supporting wire, a clamping band to fit around the object to be supported, lugs formed at the terminating ends of said band, said lugs having aligned openings therein through which the wire is threaded, said lugs having aligned notches at opposite sides with which the wire is engaged when bent around the lugs.

2. A clamping band for attaching tie wire to an object to be supported, said clamping band being stirrup-shaped, the terminating ends of said band being provided with projecting lugs, said lugs having aligned openings therein and notches formed at opposite sides of said lugs whereby a wire may be threaded through said lugs and bent around said lugs in engagement with said notches to firmly clamp said wire to the clamping band.

CHARLES D. GILMAN.